United States Patent [19]

Ikeda et al.

[11] Patent Number: 4,737,420

[45] Date of Patent: Apr. 12, 1988

[54] DEVICE FOR ACCOMMODATING VARIOUS SIZES OF DRY CELLS THEREIN

[75] Inventors: Kei Ikeda, Yokohama; Kimio Uematsu, Tokyo, both of Japan

[73] Assignee: Nippon Kogaku K. K., Tokyo, Japan

[21] Appl. No.: 894,961

[22] Filed: Aug. 8, 1986

[30] Foreign Application Priority Data

Aug. 13, 1985 [JP] Japan .................................. 60-178425

[51] Int. Cl.[4] .............................................. H01M 2/10
[52] U.S. Cl. .......................................... 429/1; 429/9; 429/99; 439/627
[58] Field of Search ...................... 429/1, 9, 96, 97, 99, 429/100; 339/31 R, 31 M, 32 R, 32 M, 33, 152, 154 R, 154 A, 156 R, 184 M, 186 M; 439/166–175, 217–224, 627

[56] References Cited

U.S. PATENT DOCUMENTS

| | | | |
|---|---|---|---|
| 2,397,469 | 4/1946 | Casanov | 429/1 |
| 3,301,712 | 1/1967 | Bach | 429/100 |
| 3,880,673 | 4/1975 | Buhrer | 429/100 |
| 3,990,919 | 11/1976 | Krueger | 429/100 |
| 4,161,568 | 7/1979 | Luno | 429/99 |
| 4,383,007 | 5/1983 | Murphy | 429/1 |
| 4,595,641 | 6/1986 | Giurtino | 429/1 |
| 4,666,278 | 5/1987 | Uematsu et al. | 354/288 |

FOREIGN PATENT DOCUMENTS 1441645 7/1976 United Kingdom ................ 429/100

Primary Examiner—John McQuade
Attorney, Agent, or Firm—Shapiro and Shapiro

[57] ABSTRACT

A dry cell accommodating device includes a dry cell chamber, a cover and a dry cell holder. When a plurality of larger dry cells, for instance, size "AA" dry cells are accommodated, they are fitted into the interior of the dry cell chamber without any necessity for the dry cell holder. When a plurality of smaller dry cells, for instance, size "AAA" dry cells are accommodated, they are first held by means of the dry cell holder and the latter is then fitted into the dry cell chamber together with the dry cells. The device is provided with a mechanism for inhibiting an occurrence of incorrect fitting of the dry cell holder. The mechanism comprises a plurality of projections on the bottom of the dry cell chamber and a plurality of recesses formed at the lower part of the dry cell holder to be fitted over the projections when the dry cell holder is oriented in the correct direction. Further, the device is provided with another mechanism for inhibiting incorrect fitting of smaller dry cells. The last-mentioned mechanism comprises a pair of projections formed on one side of the dry cell holder and an insulation ring fitted around the outer periphery of the end part of a terminal rod disposed on the other side of the holder.

14 Claims, 7 Drawing Sheets

DEVICE FOR ACCOMMODATING VARIOUS SIZES OF DRY CELLS THEREIN

BACKGROUND OF THE INVENTION

1. Field of the Invention

The present invention relates to a dry cell accommodating device for various kinds of apparatus in which a plurality of dry cells are used. The invention relates more particularly to a dry cell accommodating device in which a plurality of dry cells having different dimensions can be accommodated.

2. Related Background Art

Devices are known in which two kinds of dry cells can be separately used in accordance with operational requirements—as, for example, when the device is to be operated under different loads. Since a dry cell having one capacity has different dimensions from those of a dry cell having another capacity, there is a necessity for providing a plurality of dry cell accommodating devices each of which includes a different size of dry cell chamber corresponding to the dry cells to be used. In practice, these dry cell accommodating devices are separately used depending on the kind of dry cells required.

Accordingly, one dry cell accommodating device is required for each size of dry cells resulting in the device being manufactured at an increased cost. In the case where a portable apparatus is used, one of two sizes of dry cell accommodating devices should be always carried by the user. However, due to a necessity that each of the conventional dry cell accommodating devices requires a contact mechanism for the dry cells, a connecting mechanism for connecting to the positive and negative poles of dry cells accommodated in the device and a member forming a shell of the device, the devices are necessarily bulky and are thus not convenient to carry.

There is also known and commercially available a dry cell accommodating device which is so constructed that for instance, size "AA" nickel-cadmium type dry cells can be accommodated in a dry cell accommodating chamber designed for size "AA" dry cells with the aid of convertible holders. However, due to the fact that four to six dry cells are normally used for conventional dry cell powered apparatus, four to six convertible holders should be always carried by the user in order to assure that size "AA" dry cells are available in place of size "A" dry cells as required. This is very inconvenient for users.

It should be added that any one of the conventional dry cell accommodating devices has a danger of damaging or injuring electric power consuming apparatus when dry cells are accommodated with their poles reversed.

SUMMARY OF THE INVENTION

Hence, the present invention has been made with the foregoing problems of conventional dry cell accommodating devices in mind and its object resides in providing a dry cell accommodating device which assures that dry cells having smaller dimensions may be accommodated in a dry cell accommodating chamber designed for dry cells having larger dimensions without any necessity for convertible holders or the like and moreover without any danger of the poles being reversed.

Another object of the present invention is to provide a dry cell accommodating device which permits a dry cell holder adapted to be fitted into a dry cell chamber to be designed in smaller dimensions with reduced weight and such that dry cells are reliably held in a simple manner.

Another object of the present invention is to provide a dry cell accommodating device of simple construction which avoids incorrect locating of poles.

To accomplish the above objects there is proposed according to the present invention a device for accommodating different sizes of dry cells therein, comprising a dry cell chamber in which a plurality of first dry cells having predetermined dimensions can be accommodated, first terminal means disposed on the inner wall surface of the dry cell chamber by way of which electric power is taken to the outside from the first dry cells, a dry cell holder adapted to hold a plurality of second dry cells having dimensions less than those of the first dry cells and sized to be fitted into the dry cell chamber together with the second dry cells, first means for inhibiting incorrect fitting of the dry cell holder, the first means allowing the dry cell holder to be fitted into the dry cell chamber only when the dry cell holder is oriented in a predetermined direction relative to the dry cell chamber, second terminal means disposed on the dry cell holder by way of which electric power is taken to the outside from the second dry cells which are held by means of the dry cell holder, the second terminal means being connectible to the first terminal means, and second means for inhibiting incorrect fitting of the second dry cells, the second means allowing the second dry cells to be electrically connected to the second terminal means only when pole of each of the second dry cells held by means of the dry cell holder is oriented in a predetermined direction.

Thus a principal characteristic of the present invention consists in that a plurality of second dry cells having dimensions less than those of the first dry cells can be accommodated in the dry cell chamber with the aid of a dry cell holder adapted to be fitted into the dry cell chamber. Electric power stored in the dry cells can be taken to the outside by way of the terminals disposed on the inner wall surface of the dry cell chamber. The device of the invention is provided with a first means for inhibiting incorrect fitting of the dry cell holder which comprises a combination of a plurality of projections on the bottom of the dry cell chamber and a plurality of recesses formed at the lower part of the dry cell holder. Further, the device of the invention is provided with a second means for inhibiting incorrect fitting of the second dry cells which comprises a combination of a pair of projections formed on one side of the dry cell holder and an insulation ring fitted around the outer periphery of one of two terminal rods disposed on the other side of the same. Owing to the arrangement of the device in the above-described manner, the dry cell holder can be fitted into the dry cell chamber only when it is oriented in a predetermined direction and moreover the second dry cells can be electrically connected to the second terminal means only when a pole of each of the second dry cells is oriented in a predetermined direction.

As will be readily apparent from the above description, the present invention has advantageous characteristics in that the device is very simple in structure, it is designed in smaller dimensions with reduced weight and it can be handled easily. Another advantageous feature of the present invention is that the device is provided with means for inhibiting incorrect fitting both of the dry cell holder and of the second dry cells. Thus, the device of the invention is entirely free from incorrect function and incorrect electrical connection.

Other objects, features and advantages of the present invention will become readily apparent from reading of the following description which has been prepared in conjunction with the accompanying drawings.

BRIEF DESCRIPTION OF THE DRAWINGS

The accompanying drawings will be briefly described below.

DETAILED DESCRIPTION OF THE PREFERRED EMBODIMENTS

Now, the present invention will be described in a greater detail with reference to the accompanying drawings which illustrate preferred embodiments thereof.

Figure 1:
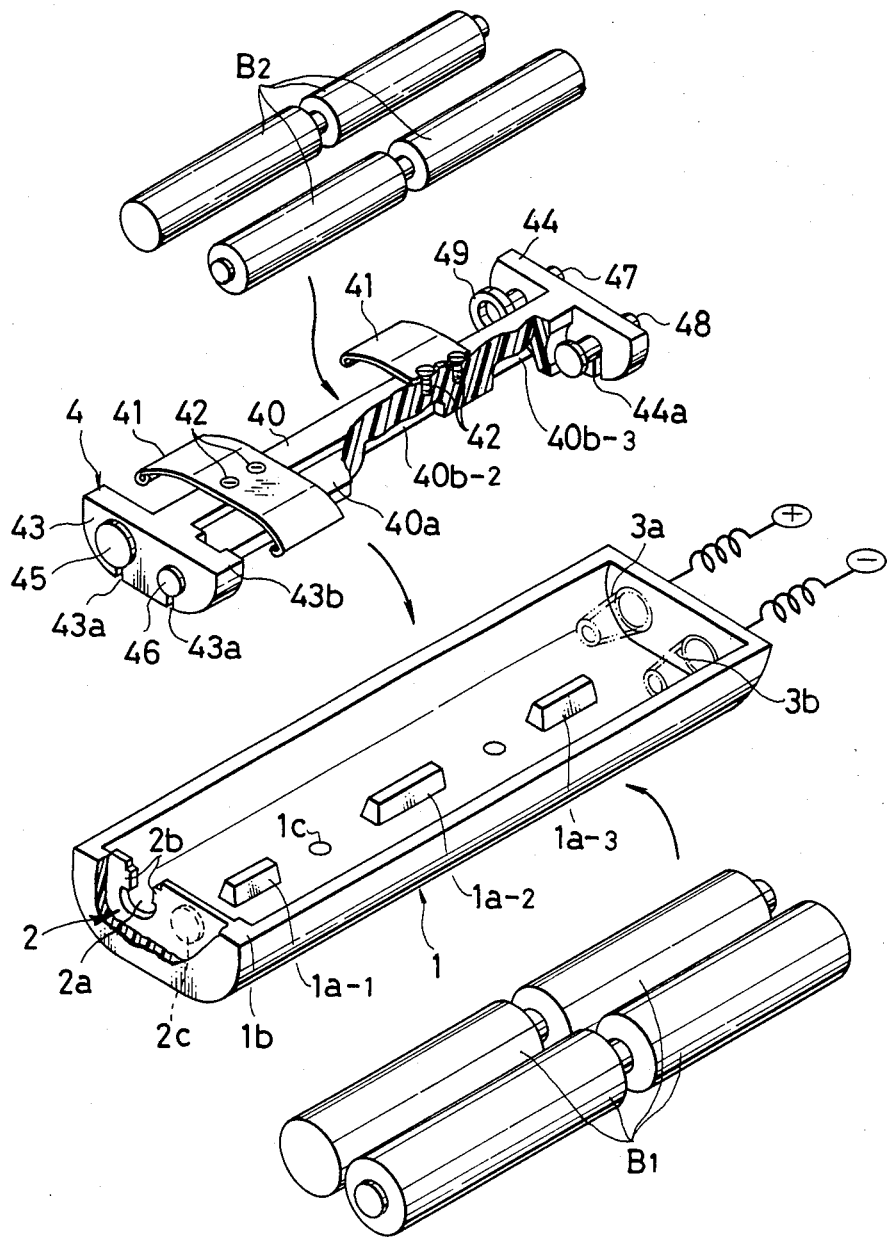
FIG. 1 is a perspective view of a dry cell accommodating device in accordance with an embodiment of the present invention, shown in the disassembled state.
Figure 2:
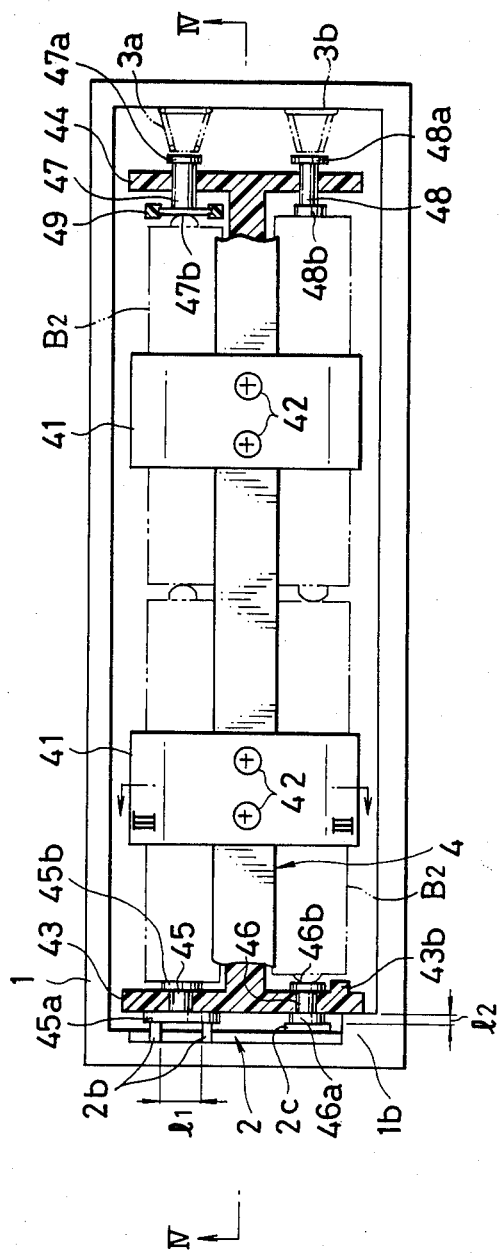
FIG. 2 is a partially sectioned plan view of the device in FIG. 1, wherein a dry cell holder is fitted into a dry cell chamber.

FIG. 1 is a perspective view of a device in accordance with an embodiment of the invention, shown in the disassembled state and FIG. 2 is a plan view of the device in FIG. 1, particularly illustrating the operative state where a dry cell holder is attached to a housing.

Referring to FIG. 1, the housing 1 constituting a dry cell chamber is molded of plastic material or the like having no electric conductivity in the wall structure. Housing 1 may be firmly fastened to the body of a dry-cell powered device with the aid of set screws (not shown) which are inserted through screw holes 1c. Incidentally, the body of the device to which the housing 1 is fastened may be, for instance, camera body or the like which is not shown for the purpose of simplification of illustration. A length of the housing 1 as measured in the longitudinal direction is so determined that two size "AA" dry cells B1 may be received in series, while a width of the same is so determined that two size "AA" may be received side by side. The housing 1 is formed with projections 1a-1, 1a-2 and 1a-3 on the bottom thereof which serve for the purpose of properly locating dry cells in two lines and inhibiting incorrect fitting of a dry cell holder to be described later.

The housing 1 is provided with terminals by way of which electric power stored in cells is supplied to a load. Specifically, it has a contact plate 2 at the left-hand end, and it has spring contacts 3a and 3b at the right-hand end as seen in the drawing. Both the contact plate 2 and the spring contacs 3a and 3b are made of metallic material having excellent electric conductivity. The contact plate 2 is formed with a U-shaped cutout 2a located opposite to the spring contact 3a and a pair of contacts 2b bent from the cutout 2a (as shown in FIG. 2) to project into the housing. The contact plate is formed with a contact 2c on the other side thereof (on the lower side as seen in FIG. 2). The contact 2c is projects into the housing 1 at a position located opposite to the spring contact 3b. It should be noted that a distance $l_1$ between two projections constituting the contacts 2b (see FIG. 2) is dimensioned larger than the diameter of the positive pole of a size "AA" dry cell, and the housing 1 is formed with a shoulder 1b at the inside corner on the side of the contact 2c. The contact 2c is spaced away from the stepped face of the shoulder 1b by a distance $l_2$ (as seen from the above in FIG. 2) which is less than the height of projection of the positive pole of a size "AA" dry cell in order to assure that only the positive pole of of such size cell may come into electric contract with the contact 2c. Thus, the dry cell accommodating chamber is constituted by a combination of the housing 1 and the contacts 2b, 2c, 3a and 3b.

Figure 3:
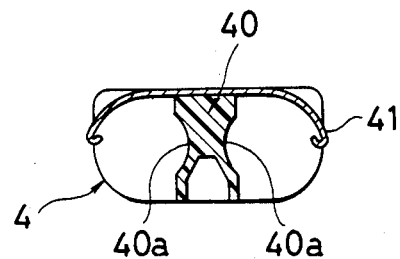
FIG. 3 is a cross-sectional view of the device taken in line III—III in FIG. 2.
Figure 4:
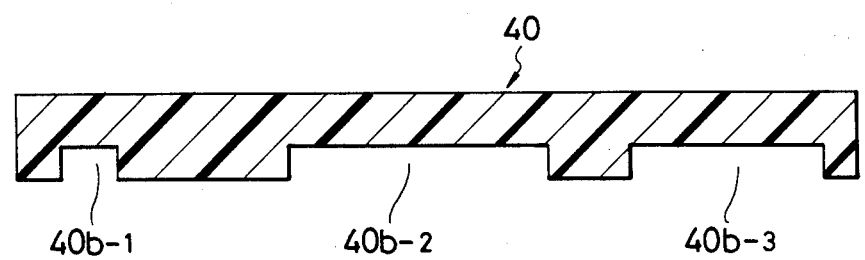
FIG. 4 is a longitudinal sectional view of the dry cell holder taken in line IV—IV in FIG. 2.

A dry cell holder 4 is designed in such a manner as to hold four size "AAA" dry cells B2 whereby the latter can be used as electric power source by fitting the dry cell holder 4 with dry cells B2 therein retained into the dry cell accommodating housing 1. FIG. 3 is a cross-sectional view of the dry cell holder taken along line III—III in FIG. 2 and FIG. 4 is a longitudinal sectional view of the dry cell holder taken along line IV—IV in FIG. 2.

Next, description will be made in more detail below as to the dry cell holder 4 with reference to FIGS. 2 to 4.

The dry cell holder 4 is molded of material having no electric conductivity and has an I-shaped configuration as seen from the above. It is made integral with a partition 40 which has grooves 40a on both the sides thereof of which the radius of curvature is the radius of a size "AAA" dry cell. Two dry cell retaining plates 41 having certain resiliency are attached to the upper surface of the partition 40 by means of set screws 42 in order that size "AAA" dry cells are held by means of the holder 4 by cooperation of the dry cell retaining plates 41 with the grooves 40a. Further, the partition 40 is formed with recesses 40b-1, 40b-2 and 40b-3 on the bottom part thereof as shown in FIG. 4 which are located opposite to the projections 1a-1, 1a-2 and 1a-3 on the bottom of the housing 1 (see FIG. 1).

Further, the dry cell holder 4 includes contact fitting portions 43 and 44 at both end parts of the partition 40. As shown in FIG. 2, the left-hand contact fitting portion 43 is provided with I-shaped contact rivets 45 and 46 which are press fitted through slits 43a (see FIG. 1). As will be apparent from FIG. 2, the contact rivet 45 is so designed that the portion located outwardly of the holder 4, that is, an outer contact 45a adapted to come in contact with the contact 2b on the housing 1, has a diameter larger than the distance $l_1$ between both the contacts 2b. On the other hand, the contact rivet 46 is so designed that an outside contact 46a located outwardly of the holder 4 has a diameter smaller than the distance $l_1$ between both the contacts 2b. The contact fitting portion 43 is formed with a projection 43b for the purpose of inhibiting incorrect dry cell accommodation at the cell position located inwardly of the inside wall surface thereof in the proximity of the contact rivet 46, as will be described in further detail later. As will be apparent from FIG. 2, the end face of the projection 43b is located inwardly of the end face of the inside contact 46b of the contact rivet 46. However, as shown in FIG. 2, the distance between the end face of the projection 43b and the end face of the inside contact 46b is less than the height of projection of the positive pole of a size "AAA" dry cell B2.

Referring to FIG. 2 again, the right-hand contact fitting portion 44 of the dry cell holder 4 is provided with I-shaped contact rods 47 and 48 which are press fitted through slits 44a (see FIG. 1) in the same manner as in the case of the contact rivets 45 and 46. Both the contact rods 47 and 48 are supported slidably relative to the contact fitting portion 44. Outside contacts 47a and 48a of the contact rods 47 and 48 located outwardly of the holder 4 have respective diameters large enough to assure that they come in contact with the spring contacts 3a and 3b when the holder 4 is fitted to the housing 1. Thus, any deviation of the center points of the spring contacts 3a and 3b from those of the contact rods 47 and 48 does not lead to an occurrence of malfunction. As shown in FIG. 2, an inside contact 47b of the right-hand contact rod 47 located opposite to the left-hand contact rivet 45 is fitted with an insulation ring 49 made of material having no electric conductivity. Ring 49 covers the whole outer periphery of the contact 47b. The depth as measured from the end face of the insulation ring 49 to the inside contact 47b is less than the height of projection of the positive pole of a size "AAA" dry cell.

Next, description will be made with reference to FIGS. 5 and 6 as to how the dry cell accommodating device of the invention constructed in the above-described manner is used in practice.

Figure 5:
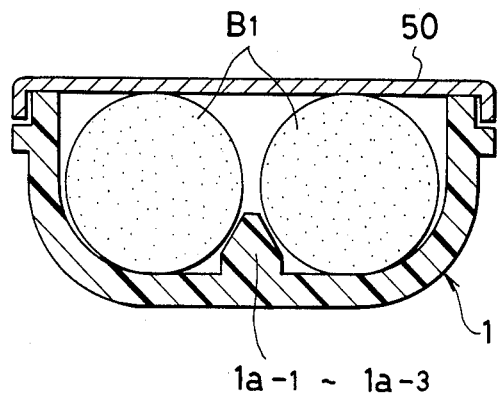
FIG. 5 is a cross-sectional view of the device in FIG. 2, particularly illustrating the operative state where a plurality of first dry cells having larger dimensions are accommodated in the dry cell chamber.

(I) In the case where size "AA" dry cells are used:

FIG. 5 is a cross-sectional view of the device of the invention which illustrates the case where size "AA" dry cells B1 are used. In this case the dry cell holder 4 is removed from the housing 1 and size "AA" dry cells B1 are then inserted directly into the interior of the housing 1. Thereafter, a cover 50 is fitted onto the housing 1 whereby the dry cells are inhibited from falling out from the interior of the housing 1. The position of each of the size "AA" dry cells B1 as seen in the transverse direction is determined by means of the projections 1a-1, 1a-2 and 1a-3 on the bottom of the housing 1 (see FIG. 1). In this case it is possible to properly supply electric power from the device of the invention only when a plurality of size "AA" dry cells B1 (for instance, four dry cells) are accommodated in such a manner that a negative pole of size "AA" dry cell B1 comes directly in contact with the contact 2b and a positive pole of another size "AA" dry cell B1 comes directly in contact with the contact 2c. However, when a size "AA" dry cell is incorrectly inserted in such a manner that its positive pole is located on the side of the contact 2b, the positive pole assumes a position located between both the contacts 2b due to the fact that the distance $l_1$ between the two projections constituting the contacts 2b (see FIG. 2) is larger than the diameter of the positive pole. Thus, no electrical connection is established between the contacts 2b and the positive pole. On the other hand, when the negative pole of a size "AA" dry cell is located on the side of the contact 2c, it is brought in contact with the shoulder 1b of the housing 1 and so does not make contact with the contact 2c. Therefore, no electrical connection is established between the contact 2c and the negative pole.

Figure 6:
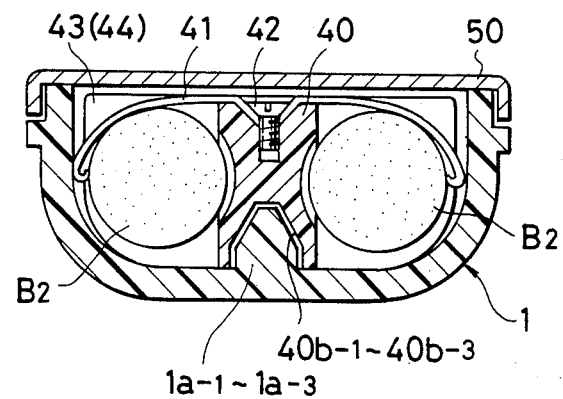
FIG. 6 is a cross-sectional view of the device in FIG. 2, particularly illustrating the operative state where a plurality of second dry cells having smaller dimensions are accommodated in the dry cell chamber.

(II) In the case where size "AAA" dry cells are used:

FIG. 6 is another cross-sectional view of the device of the invention which illustrates the case where size "AAA" dry cells B2 are used. When a size "AAA" dry cell is forcibly fitted into the space as defined between the free end of a dry cell retaining plate 41 and a groove 40a on the partition 40, it is positively held in such a manner as illustrated in FIG. 6 due to the effect of resilient force of the dry cell retaining plate 41.

Figure 7:
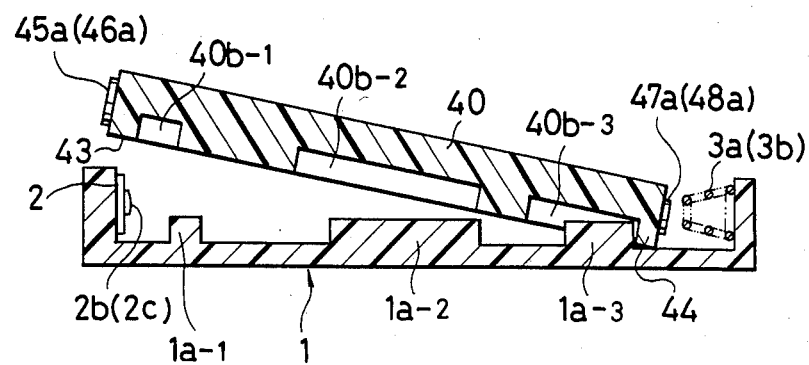
FIG. 7 is a longitudinal sectional view of the device, particularly illustrating how the dry cell holder is fitted into the dry cell chamber.
Figure 8:
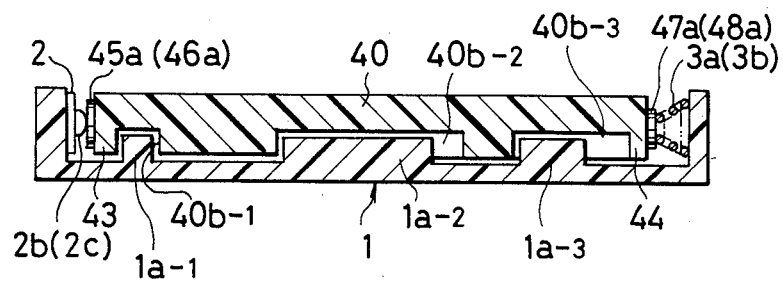
FIG. 8 is a longitudinal sectional view of the device, particularly illustrating the operative state where fitting of the dry cell holder into the dry cell chamber is completed.

After all size "AAA" dry cells B2 are fitted to the holder 4 in the above-described manner, the latter is inserted in the housing 1 and a cover 50 is then fitted onto the housing 1. Thus, there is no danger of causing the size "AAA" dry cells to fall out of the interior of the housing 1. It should be noted that the holder 4 is accommodated in the housing 1 in such a manner that the recesses 40b-1, 40b-2 and 40b-3 on the partition 40 of the holder 4 are located opposite to the projections 1a-1, 1a-2 and 1a-3 on the bottom of the housing 1 as shown in FIG. 7. As a result, the projections 1a-1, 1a-2 and 1a-3 on the housing 1 are loosely inserted into the recesses 40b-1, 40b-2 and 40b-3 on the partition 40 as shown in FIG. 8. As will be apparent from FIG. 7, fitting of the holder 4 is carried out by way of the steps of allowing the contacts 47a and 48a on the contact rods 47 and 48 to abut against the spring contacts 3a and 3b and then fitting the recesses 40b-1, 40b-2 and 40b-3 onto the projections 1a-1, 1a-2 and 1a-3. Since the length of each of the recesses 40b-2 and 40b-3 as measured in the longitudinal direction is greater than the length of the corresponding projection 1a-2 or 1a-3 as measured in the longitudinal direction, fitting of the holder 4 is easily achieved.

Since the contact rods 47 and 48 are adapted to slide relative to the contact fitting portion 44, when a plurality of size "AAA" dry cells are accommodated with the aid of the holder 4 (see FIG. 2), dimensional error of the size "AAA" dry cells B2 in the longitudinal direction can be compensated reliably. Further, since the contact rods 47 and 48 are adapted to slide as mentioned above and resilient force of the spring contacts 3a and 3b is exerted on the dry cells accommodated in the interior of the holder 4 when the latter is fitted to the housing, the dry cells are caused to abut against the contacts with a predetermined force. The dry cells accommodated in the holder 4 are electrically connected with the terminals 2b, 2c, 3a and 3b on the dry cell accommodating chamber via the contact rivets 45 and 46 and the contact rods 47 and 48.

The dry cell holder 4 is also provided with a mechanism for inhibiting incorrect orientation of dry cells, which mechanism will be described below. Specifically, normal electric current flow is achieved only when dry cells are so accommodated that their positive poles come in contact with the contacts 46b and 47b and their negative poles come in contact with the contacts 45b and 48b. If one negative pole is located on the side of the contact 47b, it fails to come in contact with the contact 47b due to presence of the insulation ring 49 which is fitted around the contact 47b. If a negative pole is located on the side of the contact 46b, it also fails to come in contact with the contact 46b due to the fact that it abuts against the projection 43b on the holder 4.

In the illustrated embodiment the holder 4 should be fitted to the housing 1 after four size "AAA" dry cells are accommodated in the interior of the holder 4. However, the present invention should not be limited only to this. Alternatively, the dry cell retaining plates 41 may be located on the bottom side of the partition 41 in order that dry cells can be accommodated even after the empty holder 4 is fitted to the housing 1. It is found that this type of arrangement is also convenient for the user.

Figure 9:
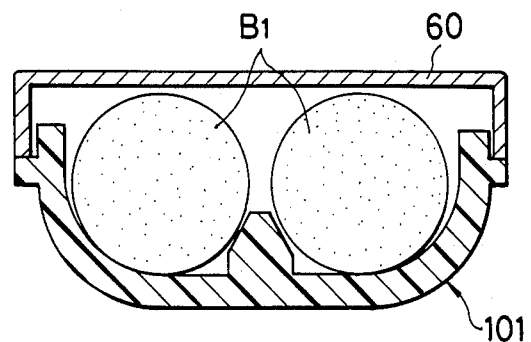
FIG. 9 is a cross-sectional view of a dry cell accommodating device in accordance with another embodiment of the present invention, wherein a plurality of first dry cells having larger dimensions are accommodated in a dry cell chamber which is different from that in FIG. 5.
Figure 10:
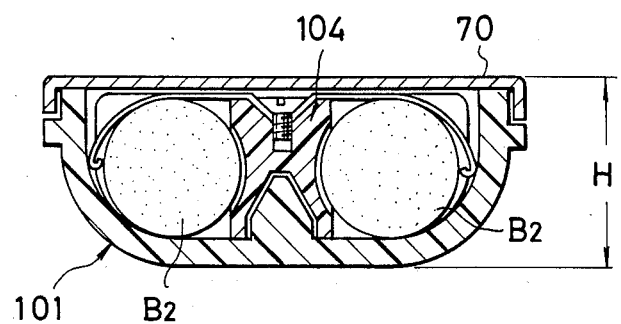
FIG. 10 is a cross-sectional view of the device in FIG. 9, wherein a dry cell holder which is different from that in FIG. 6 is fitted into the dry cell chamber together with a plurality of second dry cells having smaller dimensions.

Next, FIGS. 9 and 10 illustrate a dry cell accommodating device in accordance with another embodiment of the present invention. This embodiment consists in that housing 1 has a reduced depth and a holder 104 has a reduced height. This makes it possible to reduce the height H of the device when size "AAA" dry cells are accommodated (see FIG. 10). However, in the case of this embodiment, it is preferable to separately provide a cover 60 for size "AA" dry cells and a cover 70 for size "AAA" dry cells, the covers having a different height from one another.

Next, description will be made with reference to FIGS. 11 to 14 of mechanism for avoiding incorrect fitting of a holder 4.

Figure 11:
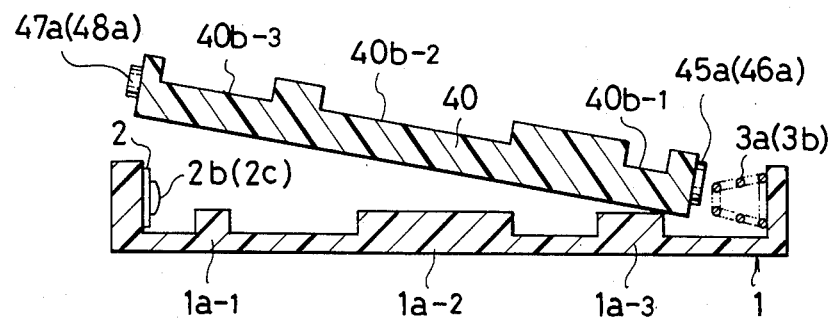
FIG. 11 is a longitudinal sectional view of the device, particularly illustrating how a user might attempt incorrectly to fit the dry cell holder upside down into the dry cell chamber.
Figure 12:
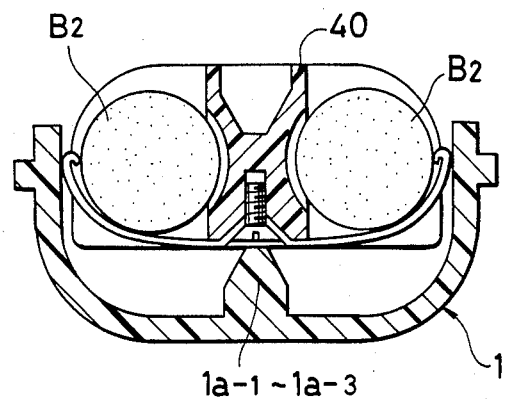
FIG. 12 is a cross-sectional view of the device, particularly illustrating the inoperative state where the dry cell holder as shown in FIG. 6 is incorrectly held upside down.
Figure 13:
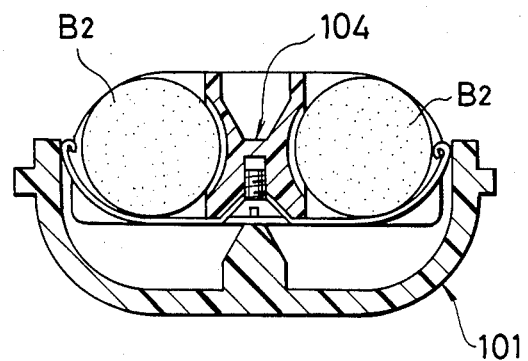
FIG. 13 is a cross-sectional view of the device similar to FIG. 12, particularly illustrating the inoperative state where the dry cell holder as shown in FIG. 10 is incorrectly held upside down.

As shown in FIG. 11, it is assumed that a user is attempting to fit the holder 4 to the housing 1 while the holder is held upside down. In this case the upper surface of the holder 4 abuts against the projections 1a-1, 1a-2 and 1a-3 on the bottom of the housing 1, resulting in the holder 4 failing to be fitted normally. As shown in FIG. 12 with respect to the embodiment in FIGS. 1 to 6 and further as shown in FIG. 13 with respect to the embodiment in FIGS. 9 and 10, it can be readily recognized that normal fitting cannot be achieved due to the fact that the holders 4 and 104 are placed on the projections 1a-1, 1a-2 and 1a-3. Further, since the contact plate 2 is formed with the cutout 2a from which a pair of contacts 2b project at a separation of $l_1$ larger than the diameter of each of the outside contacts 47a and 48a, a contact rod located opposite to the cutout 2a will not come in contact with the contacts 2b, even when both the contact rivets 3a and 3b are brought in contact with the spring contacts 45 and 46 while the holder 4 is turned by an angle of 180 degrees. Thus, no electrical connection is established.

Figure 14:
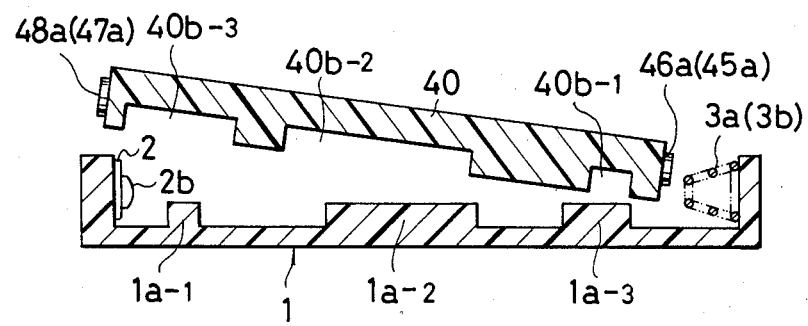
FIG. 14 is a longitudinal sectional view of the device, particularly illustrating how the dry cell holder as shown in FIG. 7 is incorrectly fitted into the dry cell chamber while it is turned by an angle of 180 degrees from the correct position.

FIG. 14 is a vertical sectional view of the device which illustrates an attempt to fit the holder 4 to the housing 1 while it is held in the incorrect operative state where it is turned by an angle of 180 degrees. As will be readily apparent from the drawing, the recesses 40b-1, 40b-2 and 40b-3 cannot be fitted onto the projections 1a-1, 1a-2 and 1a-3. Thus, the user can readily recognize that the holder 4 is being fitted incorrectly. Further, due to the fact that the contact 48a fails to come in contact with the contact 2b, no electrical connection is established for the same reasons as mentioned above.

In the above-described embodiments of the invention the contacts 2b, 2c, 3a and 3b are provided directly on the housing 1. However, the present invention is not be limited only to this arrangement. Alternatively, these contacts may be provided on the body of an electric power consuming device (for instance, camera body or the like) to which the dry cell accommodating device is attached. In this case the contacts are arranged in such a manner that they project into the interior of the housing 1.

As will be readily understood from the above description, a plurality of projections in the central area on the bottom of the housing are utilized as means for inhibiting incorrect fitting of a dry cell holder in the housing (for larger size dry cells), while an insulation ring fitted around the positive pole contact terminal is utilized as means for inhibiting incorrect fitting of a dry cell in the holder (for smaller size dry cells) and so assure that the negative pole does not contact with the contact terminal. Thus, means for inhibiting an occurrence of incorrect fitting can be constructed very simply. As a result, a dry cell accommodating device having high safety and reliability can be provided for users.

While the present invention has been described above with respect to a few preferred embodiments thereof, it should of course be understood that it should not be limited only to such embodiments and that various changes or modifications may be made in any acceptable manner without departure from the spirit and scope of the invention as defined by the appended claims.

What is claimed is:

1. A device for accommodating different sizes of dry cells, comprising:
   a dry cell chamber configured to accommodate a plurality of first dry cells of a first size therein,
   first terminal means associated with said dry cell chamber for connecting the first dry cells to supply electric power to a load when said first dry cells are accommodated in said dry cell chamber,
   a dry cell holder adapted to hold a plurality of second dry cells of a second size smaller than said first size, said dry cell holder being configured to fit in said dry cell chamber at a normal position with said second dry cells held therein,
   second terminal means associated with said dry cell holder for connecting said second dry cells to said first terminal means when said holder with said second dry cells held therein is at said normal position in said dry cell chamber, whereby electric power from said second dry cells held by said holder may be supplied to a load by way of said first terminal means, first inhibiting means for inhibiting incorrect fitting of said dry cell holder into said dry cell chamber, said first inhibiting means allowing said dry cell holder to be fitted in said dry cell chamber at said normal position only when said dry cell holder is in a predetermined orientation, and second inhibiting means for inhibiting incorrect fitting of said second dry cells in said dry cell holder, said second inhibiting means allowing said second dry cells to be operatively electrically connected to said second terminal means only when each of said second dry cells is oriented in a predetermined direction.

2. A device according to claim 1, wherein said first inhibiting means comprises a plurality of projections on an inner wall of said dry cell chamber and a plurality of recesses formed on said dry cell holder, said recesses being fittable over said projections only when said dry cell holder is in said predetermined orientation.

3. A device according to claim 1, wherein said second terminal means comprises a positive terminal and a negative terminal and said second inhibiting means comprises an insulation ring fitted around the outer periphery of said positive terminal such that said positive terminal cannot make electrical contact with a negative pole of a second dry cell held by said dry cell holder adjacent to positive terminal.

4. A device according to claim 1, wherein:

said dry cell chamber includes a plurality of projections positioned to locate said first dry cells in a parallel arrangement within said dry cell chamber, said dry cell holder includes a longitudinally extending partition adapted to hold said second dry cells in a parallel arrangement, a pair of transversely extending projections disposed respectively at opposite ends of said partition and carrying said second terminal means, and a plurality of resilient dry cell retaining plates adapted to urge adjacent parallel-arranged second dry cells toward opposite side walls of said partition, and said first inhibiting means includes a plurality of recesses formed in a bottom part of said partition, which recesses fit over said projections of said dry cell chamber only when said dry cell holder is in said predetermined orientation.

5. A device according to claim 4, wherein:

said first terminal means includes a terminal plate adapted to come in contact with a positive pole of one first dry cell and a negative pole of a first dry cell adjacent and parallel to said one first dry cell such that said plurality of first dry cells may be connected in series, and a pair of spring contacts disposed near an inner wall of said dry cell chamber opposite from said terminal plate for contacting the series-connected first dry cells and delivering electric power therefrom, said second terminal means includes a pair of contact rivets carried on one of said projections of said dry cell holder for contacting said terminal plate, and a pair of terminal rods carried on the other of said projections of said dry cell holder for contacting said spring contacts, and said second inhibiting means includes at least one projection disposed on said dry cell holder to prevent one of said contact rivets disposed to one side of said partition from contacting a negative pole of a second dry cell held adjacent to said one contact rivet and an insulation ring fitted onto an end of one of said terminal rods disposed to another side of said partition to prevent said one terminal rod from contacting a negative pole of a second dry cell held adjacent to said one terminal rod.

6. A device for accommodating different sizes of dry cells, comprising:

a dry cell chamber configured to accommodate a plurality of first dry cells of a first size therein, first terminal means associated with said dry cell chamber for connecting the first dry cells to supply electric power to a load when said first dry cells are accommodated in said dry cell chamber, a dry cell holder adapted to hold a plurality of second dry cells of a second size smaller than said first size, said dry cell holder being configured to fit in said dry cell chamber at a normal position with said second dry cells held therein, second terminal means associated with said dry cell holder for connecting said second dry cells to said first terminal means when said holder with said second dry cells held thereby is at said normal position in said dry cell chamber, whereby electric power from said second dry cells held by said holder may be supplied to a load by way of said first terminal means, and inhibiting means for inhibiting incorrect fitting of said dry cell holder into said dry cell chamber, said inhibiting means allowing said dry cell holder to be fitted in said dry cell chamber at said normal position only when said dry cell holder is in a predetermined orientation.

7. A device according to claim 6, wherein said dry cell chamber and said dry cell holder have projections and recesses which cooperate to inhibit incorrect fitting of said dry cell holder in said dry cell chamber.

8. A device according to claim 6, wherein:

said first terminal means includes a positive contact and a negative contact at one end of said dry cell chamber and terminal plate means at an opposite end of said dry cell chamber having two electrically connected contacts respectively disposed opposite said positive contact and said negative contact such that said first dry cells may be accommodated in series between said positive contact and said negative contact, one of said two contacts is disposed for contacting only a positive pole of a first dry cell accommodated adjacent thereto, and the other of said two contacts is disposed for contacting only a negative pole of a first dry cell accommodated adjacent thereto.

9. A device according to claim 8, wherein said other contact has two contact portions spaced apart further than the diameter of the positive pole of a first dry cell and disposed such that the positive pole of a first dry cell accommodated in said dry cell chamber adjacent to said other contact cannot come into electrical contact with either of said two contact portions.

10. A device according to claim 9, wherein said second terminal means include four contact members disposed to contact the contacts of said first terminal means, respectively, when said dry cell holder is fitted in said dry cell chamber at said normal position, at least one of said four contact members having a diameter smaller than the spacing between said two contact portions such that it cannot make electrical contact with either of said two contact portions in the event that said dry cell holder is incorrectly fitted in said dry cell chamber.

11. A device according to claim 10, wherein three of said four contacts have a diameter smaller than the spacing between said two contact portions.

12. A device according to claim 8, wherein said dry cell chamber has a protrusion disposed such that the negative pole of a first dry cell accommodated in said dry cell chamber adjacent to said one contact of said terminal plate means cannot make electrical contact with said one contact of said terminal plate means.

13. A device for accommodating different sizes of dry cells, comprising:
   a dry cell chamber configured to accommodate a plurality of first dry cells of a first size therein,
   first terminal means associated with said dry cell chamber for connecting the first dry cells to supply electric power to a load when said first dry cells are accommodated in said dry cell chamber,
   a dry cell holder adapted to hold a plurality of second dry cells of a second size smaller than said first size, said dry cell holder being configured to fit in said dry cell chamber at a normal position with said second dry cells held therein,
   second terminal means associated with said dry cell holder for connecting said second dry cells to said first terminal means when said holder with said second dry cells held therein is at said normal position in said dry cell chamber, whereby electric power from said second dry cell held by said holder may be supplied to a load by way of said first terminal means, and
   inhibiting means for inhibiting incorrect fitting of said second dry cells in said dry cell holder, said inhibiting means allowing said second dry cells to be operatively electrically connected to said second terminal means only when each of said second dry cells is oriented in a predetermined direction.

14. A device according to claim 13, wherein said inhibiting means includes an insulation member fitted around the periphery of a positive contact member of said dry cell holder such that the negative pole of a second dry cell held within said dry cell holder adjacent to said positive contact member cannot make electrical contact with said positive contact member.

* * * * *